(12) United States Patent
Arimilli et al.

(10) Patent No.: US 6,629,210 B1
(45) Date of Patent: Sep. 30, 2003

(54) INTELLIGENT CACHE MANAGEMENT MECHANISM VIA PROCESSOR ACCESS SEQUENCE ANALYSIS

(75) Inventors: Ravi K. Arimilli, Austin, TX (US); John Steven Dodson, Pflugerville, TX (US); James Stephen Fields, Jr., Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 09/696,888

(22) Filed: Oct. 26, 2000

(51) Int. Cl.[7] ............................................. G06F 12/08
(52) U.S. Cl. ..................... 711/141; 711/144; 711/135; 711/136; 711/123
(58) Field of Search ................................ 711/117, 118, 711/119, 141, 146, 154, 135, 136, 133, 145, 144, 123

(56) References Cited

U.S. PATENT DOCUMENTS

| | | | |
|---|---|---|---|
| 5,335,335 A | | 8/1994 | Jackson et al. |
| 5,355,467 A | | 10/1994 | MacWilliams et al. |
| 5,369,753 A | | 11/1994 | Tipley |
| 5,737,759 A | * | 4/1998 | Merchant ..................... 711/146 |
| 5,809,533 A | | 9/1998 | Tran et al. |
| 5,890,200 A | * | 3/1999 | Merchant ..................... 711/108 |
| 5,987,571 A | * | 11/1999 | Shibata et al. ............... 711/137 |
| 5,995,967 A | * | 11/1999 | Iacobovici et al. ......... 711/118 |
| 6,052,760 A | * | 4/2000 | Bauman et al. .............. 711/119 |
| 6,134,643 A | * | 10/2000 | Kedem et al. ............... 711/213 |
| 6,138,217 A | | 10/2000 | Hamaguchi |
| 6,230,260 B1 | * | 5/2001 | Luick .......................... 712/239 |
| 6,282,615 B1 | | 8/2001 | Arimilli et al. |
| 2001/0010068 A1 | * | 7/2001 | Michael et al. ............. 711/119 |

OTHER PUBLICATIONS

"Processor Performance Monitoring With a Depiction of the Efficiency of the Cache Coherency Protocol of Superscalar Microprocessor in Ansymmetric Multiple Processor Environment"; IBM TDB, vol. 40, No. 1, Jan. 1997, pp. 79–81 XP000686109.*

* cited by examiner

Primary Examiner—Pierre-Michel Bataille
(74) Attorney, Agent, or Firm—Casimer K. Salys; Bracewell & Patterson, L.L.P.

(57) ABSTRACT

In addition to an address tag, a coherency state and an LRU position, each cache directory entry includes historical processor access information for the corresponding cache line. The historical processor access information includes different subentries for each different processor which has accessed the corresponding cache line, with subentries being "pushed" along the stack when a new processor accesses the subject cache line. Each subentries contains the processor identifier for the corresponding processor which accessed the cache line, one or more opcodes identifying the operations which were performed by the processor, and timestamps associated with each opcode. This historical processor access information may then be utilized by the cache controller to influence victim selection, coherency state transitions, LRU state transitions, deallocation timing, and other cache management functions so that smaller caches are given the effectiveness of very large caches through more intelligent cache management.

16 Claims, 4 Drawing Sheets

INTELLIGENT CACHE MANAGEMENT MECHANISM VIA PROCESSOR ACCESS SEQUENCE ANALYSIS

The present invention is related to the subject matter of commonly assigned, U.S. patent applications Ser. No. 09/696,912 entitled "DYNAMIC CACHE MANAGEMENT IN A SYMMETRIC MULTIPROCESSOR SYSTEM VIA SNOOP OPERATION SEQUENCE ANALYSIS"; Ser. No. 09/696,887 entitled "ENHANCED CACHE MANAGEMENT MECHANISM VIA AN INTELLIGENT SYSTEM BUS MONITOR"; Ser. No. 09/696,890 entitled "ENHANCED MULTIPROCESSOR RESPONSE BUS PROTOCOL ENABLING INTRA-CACHE LINE REFERENCE EXCHANGE"; Ser. No. 09/696,910 entitled "HIGH PERFORMANCE CACHE INTERVENTION MECHANISM FOR SYMMETRIC MULTIPROCESSOR SYSTEMS"; and Ser. No. 09/696,889 entitled "SYMMETRIC MULTIPROCESSOR ADDRESS BUS PROTOCOL WITH INTRA-CACHE LINE ACCESS INFORMATION". The content of the above-identified applications are incorporated herein by reference.

BACKGROUND OF THE INVENTION

1. Technical Field

The present invention generally relates to an improved data processing system and in particular to improved memory management in a data processing system. Still more particularly, the present invention relates to improved cache memory management in a data processing system, which includes dynamic cache management algorithms driven by includes dynamic cache management algorithms driven by processor access sequence tracking.

2. Description of the Related Art

Most data processing systems are controlled by one or more processors and employ various levels of memory. Typically, programs and data are loaded into a data processing system's memory storage areas for execution or reference by the processor, and are stored in different portions of the memory storage depending on the processor's current need for such programs or data. A running program or data referenced by a running program must be within the system's main memory (primary or main storage, which is typically random access memory). Programs or data which are not needed immediately may be kept in secondary memory (secondary storage, such as a tape or disk drive) until needed, and then brought into main storage for execution or reference. Secondary storage media are generally less costly than random access memory components and have much greater capacity, while main memory storage may generally be accessed much faster than secondary memory.

Within the system storage hierarchy, one or more levels of high-speed cache memory may be employed between the processor and main memory to improve performance and utilization. Cache storage is much faster than the main memory, but is also relatively expensive as compared to main memory and is therefore typically employed only in relatively small amounts within a data processing system. In addition, limiting the size of cache storage enhances the speed of the cache. Various levels of cache memory are often employed, with trade-offs between size and access latency being made at levels logically further from the processor(s). Cache memory generally operates faster than main memory, typically by a factor of five to ten times, and may, under certain circumstances, approach the processor operational speed. If program instructions and/or data which are required during execution are pre-loaded in high speed cache memory, average overall memory access time for the system will approach the access time of the cache.

In order to enhance performance, contemporary data processing systems often utilize multiple processors which concurrently execute portions of a given task. To further enhance performance, such multiple processor or multi-processor (MP) data processing systems often utilize a multi-level cache/memory hierarchy to reduce the access time required to retrieve data from memory. A multi-processor system may include a number of processors each with an associated on-chip, level-one (L1) cache, a number of level-two (L2) caches, and a number of system memory modules. Typically, the cache/memory hierarchy is arranged such that each L2 cache is accessed by a subset of the L1 caches within the system via a local bus. In turn, each L2 cache and system memory module is coupled to a system bus (or interconnect switch) such that an L2 cache within the multi-processor system may access data from any of the system memory modules coupled to the bus.

The use of cache memory imposes one more level of memory management overhead on the data processing system. Logic must be implemented to control allocation, deallocation, and coherency management of cache content. When space is required, instructions or data previously residing in the cache must be "swapped" out, usually on a "least-recently-used" (LRU) basis. Accordingly, if there is no room in the cache for additional instructions or data, then the information which has not been accessed for the longest period of time will be swapped out of the cache and replaced with the new information. In this manner, the most recently used information, which has the greatest likelihood of being again required, is available in the cache at any given time.

As noted, previous cache management techniques mostly depend on least-recently-used (LRU) algorithms in selecting a cache line victim for eviction and replacement. However, empirical measurements have shown that strict least-recently-used algorithms are unsatisfactory in many cases. Various enhancements to LRU algorithms have been proposed or implemented in recent years, such as software managed LRU, pseudo-random influences, etc. Basic symmetric multi-processor snooping protocols have also been utilized to influence cache management.

Even with a cache memory management scheme, there are additional, related problems that can cause system performance to suffer. For example, in data processing systems with several levels of cache/memory storage, a great deal of shuttling of instructions and data between the various cache/memory levels occurs, which consumes system resources such as processor cycles and bus bandwidth which might otherwise be put to more productive processing use. The problem has been exacerbated in recent years by the growing disparity between processor speeds and the operational speeds of the different system components used to transfer information and instructions to the processor.

It would be desirable, therefore, to provide a system increasing the "intelligence" of cache management, and in particular to explicitly utilize the detection of frequently employed storage access sequences (load/store instruction streams) to dynamically optimize cache management.

SUMMARY OF THE INVENTION

It is therefore one object of the present invention to provide an improved data processing system.

It is another object of the present invention to provide improved memory management in a data processing system.

It is yet another object of the present invention to provide improved cache memory management in a multiprocessor data processing system, which includes dynamic cache management algorithms driven by processor access sequence tracking.

The foregoing objects are achieved as is now described. In addition to an address tag, a coherency state and an LRU position, each cache directory entry includes historical processor access information for the corresponding cache line. The historical processor access information includes different subentries for each different processor which has accessed the corresponding cache line, with subentries being "pushed" along the stack when a new processor accesses the subject cache line. Each subentries contains the processor identifier for the corresponding processor which accessed the cache line, one or more opcodes identifying the operations which were performed by the processor, and timestamps associated with each opcode. This historical processor access information may then be utilized by the cache controller to influence victim selection, coherency state transitions, LRU state transitions, deallocation timing, and other cache management functions so that smaller caches are given the effectiveness of very large caches through more intelligent cache management.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
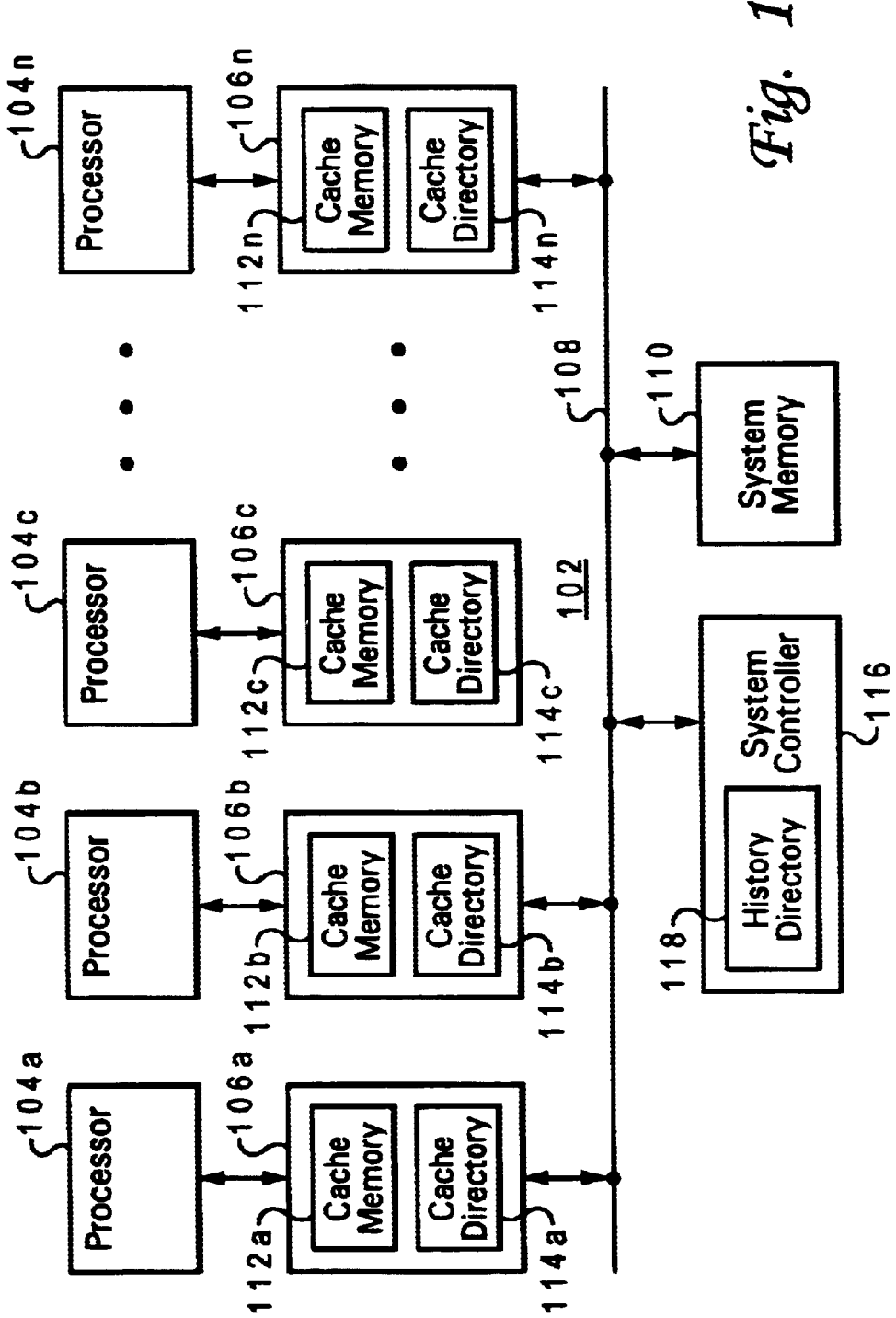
FIG. 1 depicts a multi-processor data processing system in accordance with a preferred embodiment of the present invention.

With reference now to the figures and in particular with reference to FIG. 1, a high level block diagram of a multi-processor data processing system in accordance with a preferred embodiment of the present invention is depicted. Data processing system 102 includes a plurality of processors 104a–104n (where n is any positive integer). Data processing system 102 also includes a number of caches 106a–106n between the processors 104a–104n and a system bus 108, which couples processors 104a–104n and caches 106a–106n to system memory 110 under the control of system controller 116.

Caches 106a–106n each include a cache memory and cache directory, and may be shared or private, logically in-line or look-aside, and inclusive or noninclusive caches within the present invention. Processors 104a–104n are each coupled to system memory 110 via system bus 108. In a tightly coupled symmetric multiprocessor system such as data processing system 102 in the exemplary embodiment, each processor 104a–104n may be utilized to read from and write to memory 110. Thus, systems and interlocks must be utilized to ensure that the data and instructions within memory 110 remain coherent.

Each processor 104a–104n within multiprocessor data processing system 102 includes a cache 106a–106n which may be utilized to efficiently and temporarily access and store selected instructions or data from system memory 110. Since each cache memory 112a–112n constitutes a memory space, coherency should be maintained among each cache memory 112a–112n and system memory 110 in order to assure accurate operation. Each cache 106a–106n is therefore connected to system bus 108 and snoops transactions on system bus 108.

Each cache 106a–106n also has an associated cache directory 114a–114n, which each store a plurality of cache directory entries corresponding to memory locations within cache memory 112a–112n. In the present invention, cache directory entries each contain historical processor access information as described in further detail below.

Also connected to system bus 108 is system controller 116, which may control arbitration for system bus 108 and monitor transactions on system bus 108. System controller 116 includes an associated history directory 118, which contains data relating to the present and past status of each cache 106a–106n, as described in more detail below.

Figure 2:
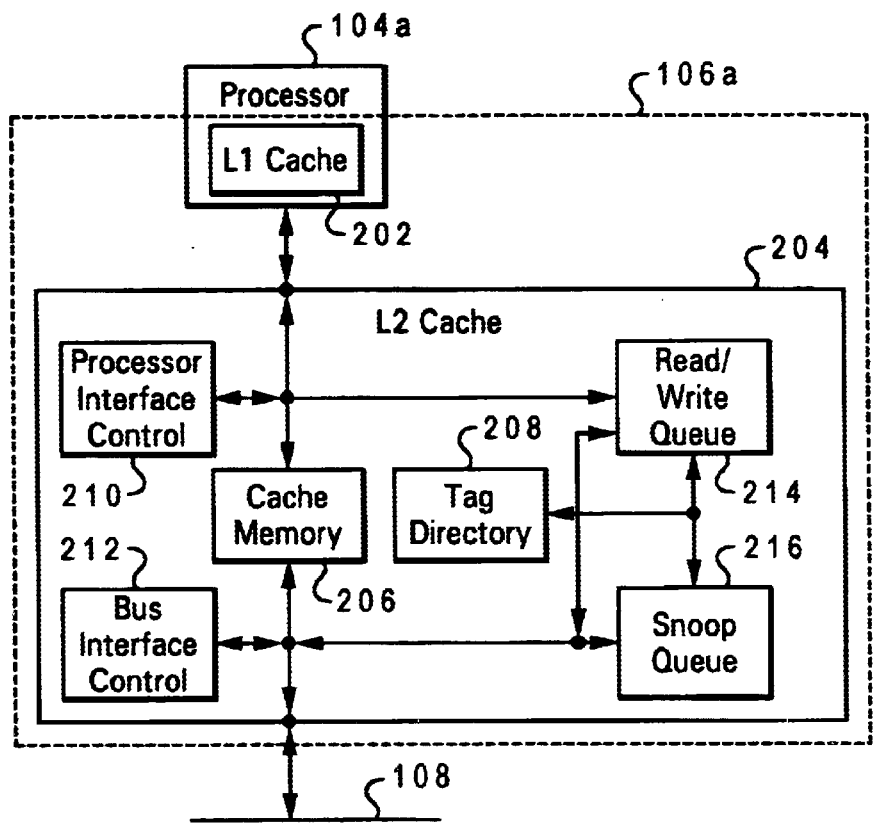
FIG. 2 is a block diagram of a portion of a specific implementation of a data processing system in accordance with a preferred embodiment of the present invention.

Referring to FIG. 2, a block diagram of a portion of a specific implementation of a data processing system in accordance with a preferred embodiment of the present invention is illustrated. The particular implementation of data processing system 102 illustrated in FIG. 2 includes a multilevel cache 106a including a level one (L1) cache 202 and a level two (L2) cache 204. Although depicted as logically discrete, L1 and L2 caches 202 and 204 may be formed within a single integrated circuit die; however, L1 cache 202 is integrally formed with the functional elements of processor 104a while L2 cache 204 is a logically separate component.

L2 cache 204 includes a cache memory 206 and a cache (address tag) directory 208, as well as processor interface control logic 210 controlling communications transactions between cache 204 and processor 104a and bus interface control logic 212 controlling communications transactions between cache 204 and system bus 108. L2 cache 204 also includes a read/write queue 214 controlling processing of data access transactions received from processor 104a within cache 204 and a snoop queue 216 controlling processing of data access transactions snooped from system bus 108 within cache 204. Processor interface control logic 210, bus interface control logic 212, read/write queue 214, and snoop queue 216 may be collectively viewed as a cache controller for L2 cache 204.

Figure 3A:
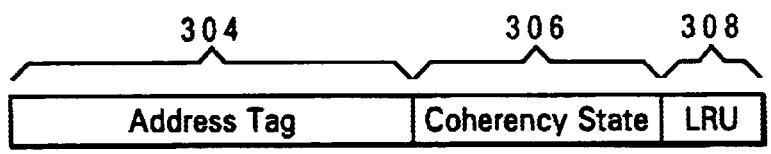
FIGS. 3A–3B depict comparative diagrams of cache directory entries in accordance with the prior art and in accordance with a preferred embodiment of the present invention.
Figure 3B:
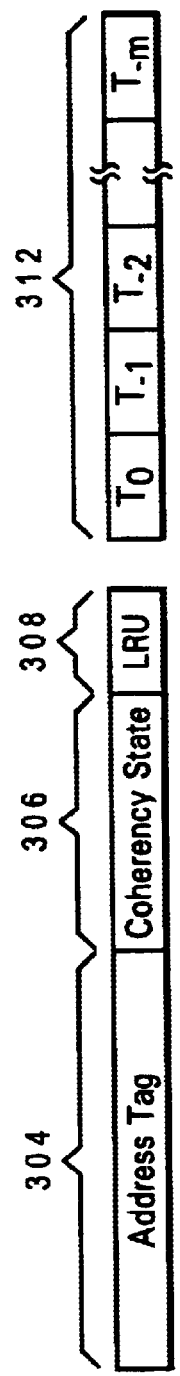

With reference now to FIGS. 3A and 3B, comparative diagrams of cache directory entries in accordance with the prior art and in accordance with the present invention are depicted. The data structures depict cache directory entries within L2 cache directory 208. FIG. 3A depicts a prior art cache directory entry format 302 for each cache line, which includes: an address tag 304, typically some subset of address bits from the system memory address for the corresponding cache line; coherency state bits 306, which identify a coherency state for the corresponding cache line; and, optionally, LRU bits 308, which identify, within a set-associative cache, the LRU position of the corresponding cache line within the congruence class indexed by the address tag.

Because each processor within a multi-processor system may modify data, such systems must generally employ a protocol to maintain memory coherence. For example, multi-processor systems utilizing processors based upon the PowerPC RISC instruction set architecture (ISA) utilize a coherency protocol having four possible states: modified (M), exclusive (E), shared (S), and invalid (I). The MESI state 306 associated with each cache line (i.e., the line state) informs the data processing system as to what memory operations are required to maintain memory coherence following an access to that cache line.

As noted above, conventional LRU bits 308 within a cache directory entry represent the LRU position within a congruence class for the corresponding cache line. These LRU positions are employed by conventional LRU cache management algorithms to select a victim within a congruence class for deallocation.

FIG. 3B depicts a cache directory entry format 310 for each cache line within cache directory 208 in accordance with the present invention. Cache directory entry format 310 includes address tag 304, coherency state bits 306, and optional LRU bits 308. In addition, Cache directory entry format 310 includes historical processor access information 312. This historical processor access information 312 allows the cache controller to track the operations performed on that cache line by the processors. Historical processor access information 312 includes an integer number m of subentries each containing information about a processor's access of the corresponding cache line. Subentry $T_0$ contains information regarding the most recent processor to access (and thereby gain either shared or exclusive "ownership" of) the corresponding cache line; subentry $T_{-1}$ contains information regarding the next most recent processor to access the corresponding cache line; subentry $T_{-2}$ contains information regarding the processor which accessed the corresponding cache line just prior to the processor of subentry $T_{-1}$; and so on, with subentry $T_{-m}$ containing information regarding the oldest available processor access information for any particular processor which previously accessed the corresponding cache line.

The number m of subentries $T_0, T_{-1}, T_{-2}, \ldots T_{-m}$ within historical processor access information 312 may or may not correspond to the number of processors which share access to the corresponding cache 204. Each subentry $T_0, T_{-1}, T_{-2}, \ldots T_{-m}$ contains an identification of the processor which accessed the cache line, and identification of each load or store type operation which was performed on the cache line by that processor, and a timestamp for each operation of when that operation was performed. Thus, each subentry $T_0, T_{-1}, T_{-2}, \ldots T_{-m}$ may contain information regarding more than one access by the corresponding processor. Each subentry $T_0, T_{-1}, T_{-2}, \ldots T_{-m}$ may contain either a fixed or a variable number of storage locations for recording access (operation) types and timestamps, with only information regarding the most recent accesses being maintained if a fixed or otherwise limited number of storage locations are provided.

With each new access of the corresponding cache line by a different processor, the content of all subentries are shifted by one position (e.g., the content of subentry $T_0$ is shifted into subentry $T_{-1}$, the content of subentry $T_{-1}$ is shifted into subentry $T_{-2}$, etc.). Information regarding the new processor access of the corresponding cache line is then stored within subentry $T_0$. If a processor reacquires a line which it had previously owned and then given up, the prior access is shifted just as if performed by a different processor and a new subentry $T_0$ is created for the current access by that processor.

During a cache line eviction, historical processor access information 312 for the evicted cache line is transmitted to the system controller 116, where it may be employed by system controller 116 to update the cache management algorithm utilized for the corresponding cache line. If the evicted cache line is subsequently accessed and cached (either within the same cache or within a different cache), the historical processor access information 312 may be appended to one or more individual snoop responses for a processor access, with the system controller 116 selecting the version which is appended to the combined snoop response for use by the cache supporting the requesting processor.

By tracking the accesses to each cache line, as well as "ownership" changes of each cache line, the cache management algorithms employed by the cache controller may be dynamically influenced. Although potentially less effective for larger caches, such dynamic cache management algorithms should help a smaller cache approach the effectiveness of a larger cache through more intelligent cache management. Historical information may be utilized to influence victim selection, coherency state transitions, LRU state transitions, deallocation timing, and other cache management functions. The historical processor access information enables the cache controller to engage in dynamic application sequence behavior, cache management which varies on a per cache line, per processor basis.

One example of how historical processor access information 312 may be employed to influence cache management arises when a cache miss occurs within a set-associative cache, causing one member of the selected congruence class to be chosen as a victim for eviction and replacement. Conventionally, victim selection is performed utilizing an LRU algorithm. With the availability of historical processor access information 312, however, the history associated with each member of the congruence class may be evaluated to determine if performance could be improved by selecting a victim other than the class member which would be ordinarily selected by the LRU algorithm. For instance, if the processor access history of one congruence class member indicates that the respective cache line is less likely to be needed by a processor before any other members of the same congruence class (e.g., one class member was accessed by a simple read operation while all other class members were accessed by read with intent to modify or "rwitm" operations), the subject class member may be selected as a victim regardless of the LRU position of that class member. If two class members are equally less likely to be required again before the rest, then the LRU positions for those two class members may be employed to select between those two.

A second example of utilizing historical processor access information 312 to improve cache management involves interventions. When a cache miss occurs on a load operation (for example), a read request is issued on the system bus to retrieve the requested data from system memory. However, a horizontal processor/cache may intervene in the memory access and source the requested data. If the response to the read request contains the processor access history from the processor/cache which is sourcing the data to satisfy the read request, the requesting cache may evaluate this history (now $T_{-1}$ subentry data within the requesting cache). If a store is likely to occur soon after the load (e.g., the cache miss prompted a rwitm operation) and the evaluation of the history indicates that an operation requesting exclusive ownership of the cache line will be required (e.g., the $T_{-1}$ subentry also contains a rwitm operation), then the cache controller may speculatively request exclusive ownership of the cache line even before the store occurs. The goal is to already have (or be in the process of obtaining) the cache line in an exclusive coherency state by the time the store occurs, effectively reducing the latency involved in servicing the store. If the expected store does not occur before the cache line is deallocated, or given up to another cache, then the fact that the "load, guess store" decision proved incorrect is logged and passed to the next owner of the cache line (as the cache lines new $T_{-1}$ history subentry. In this manner, the next owner of the cache line can adapt its algorithm to NOT speculate that a store will soon follow.

A third example of improving cache management utilizing historical processor access information 312 involves "atomic" data accesses. Among recent multiprocessor data processing systems, there has been increasing use of load-reserve and store-conditional instructions which enable atomic access to memory from multiple processors while maintaining memory coherence. For example, load-reserve (LARX) and store-conditional (STCX) instructions have been implemented in the PowerPC instruction set architecture. Additional background information about load-reserve and store-conditional instructions in a multiprocessor environment may be found, for example, in U.S. Pat. No. 5,193,167 to Sites et al, which is hereby incorporated by reference. Common usages of these instructions by software present unique performance challenges to the design of cache/memory subsystems. When several processors in a multi-processor system are attempting to acquire a lock at the same time, the transfer of ownership of the cache line containing the reservation granule between caches may be very time consuming and have significant impact to overall system performance. Because of the imbedded LARX, Compare, Branch, and STCX loops necessary to make sure the lock is acquired before the store, a STCX operation may consume 100 or more processor clock cycles. These LARX/STCX sequences result in processor access and system bus operation sequences which may be recognized by hardware if enough information is provided by the processors to the cache/memory subsystem.

Accordingly, if a cache controller sees the sequence LARX, STCX within the $T_0$ subentry of the processor access history log 312, and then subsequently sees another store issued by the same processor to the same cache line (most likely the store to release the lock), there is a high likelihood that the subject processor will not need to access the subject cache line for a considerable time and (this is a common case) that another processor/cache is competing for the same lock. Therefore, when this sequence is detected, the cache controller may change its behavior by giving up exclusive ownership of the line on the next snooped read operation to the requesting (competing) processor/cache.

The cache controller need not have a set algorithm with respect to the particular actions for employing historical processor access information 312 in the different situations described above. Instead, the cache management algorithms may be dynamic and may start with a trial (guess) based on the historical processor access information and then determine, over time, whether the guess was correct. If the initial guess was incorrect, the cache controller may alter the algorithm the next time a similar situation arises. Over time, as these correct and incorrect decisions are made to change various behaviors, the frequency of incorrect decisions will decrease and the overall cache behavior will converge to a fixed algorithm. This algorithm will eventually be upset when the current-software application (process) stops and another is started, and/or when a change occurs in the virtual to real memory address translation.

Figure 4:
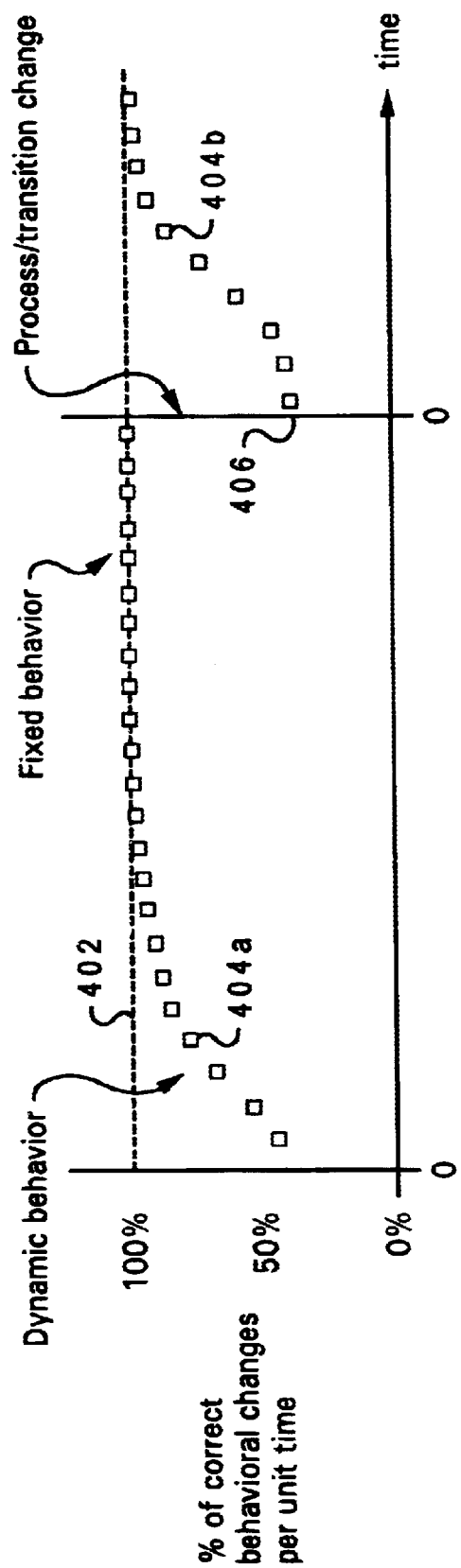
FIG. 4 is a diagram of convergence in dynamic cache management to fixed algorithm cache management utilizing historical processor access information in accordance with a preferred embodiment of the present invention.

Referring to FIG. 4, a diagram of convergence in dynamic cache management to fixed algorithm cache management utilizing historical processor access information in accordance with a preferred embodiment of the present invention is illustrated. A fixed algorithm 402 will result in constant behavior, while dynamic cache management based on historical processor access information as described above will result in changing behavior 404a–404b which gradually approaches a constant. Some events, such as a change in the current software application being run or a change in the virtual to real memory address translation, will cause the behavior, which had previously achieved a steady state, to again change with a gradual approach to a constant. Not shown, however, are the efficiency and/or performance measures achieved for each fixed region 402, which should exceed those of the corresponding dynamic regions 404a through 404b.

Figure 5:
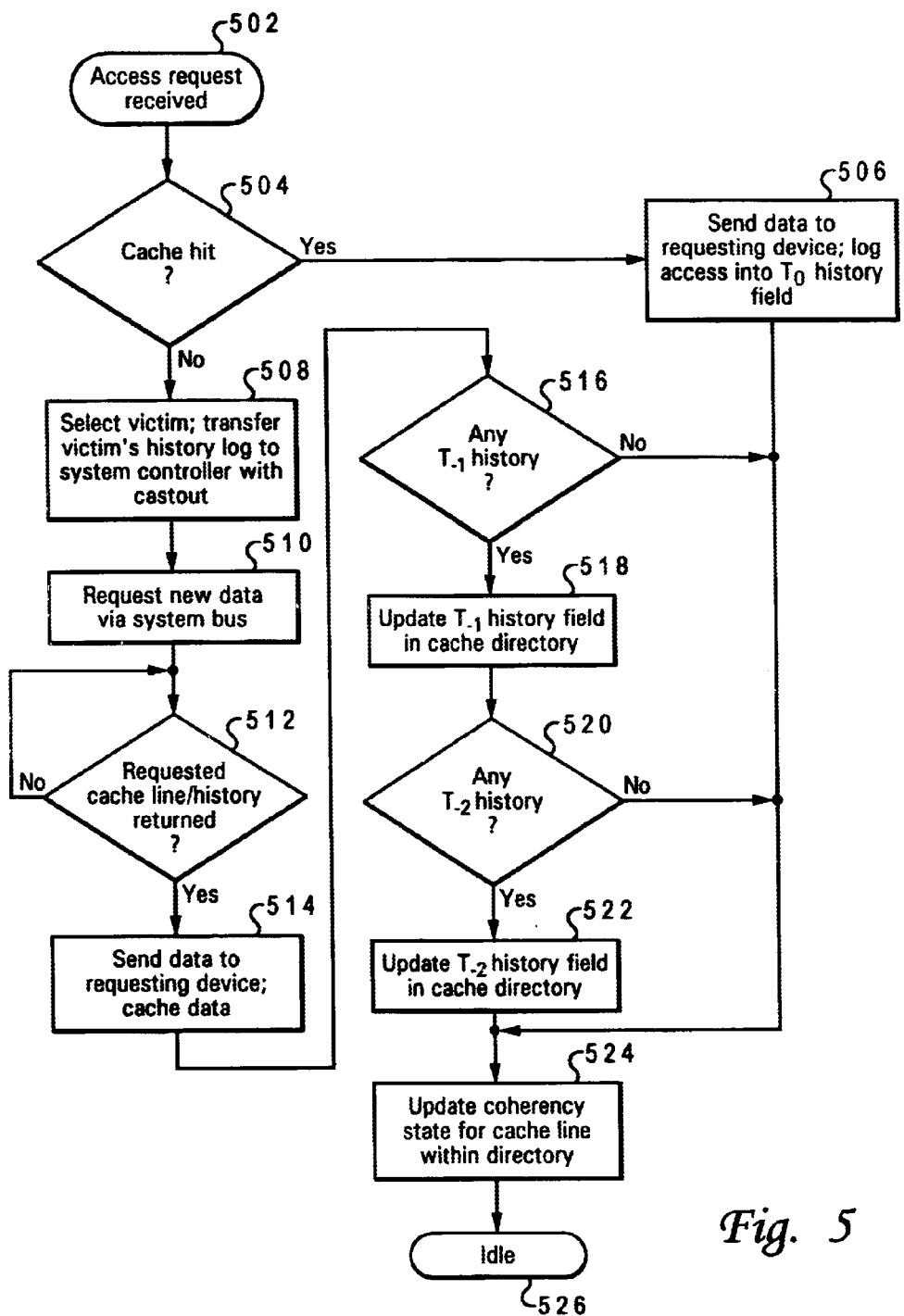
FIG. 5 depicts a high level flow chart for a process of generating and passing processor access history for cache lines in accordance with a preferred embodiment of the present invention.

With reference now to FIG. 5, a high level flow chart for a process of generating and passing processor access history for cache lines in accordance with a preferred embodiment of the present invention is depicted. The process, which is initially idle, begins at step 502, which depicts a processor access request being received at a cache such as cache 204 depicted in FIG. 2. The process first passes to step 504, which illustrates a determination of whether a cache hit for the requested cache line occurs within the cache receiving the processor access request.

If a cache hit occurs within the cache receiving the access request, the process proceeds to step 506, which depicts sending the requested cache line to the processor (or other device) which requested access and logging the access into the $T^0$ history field in the cache directory entry for the corresponding cache line. From step 506, the process then passes to step 524, described below.

If a cache miss occurs at step 504, the process proceeds instead to step 508, which illustrates selecting a victim (within the congruence class to which the requested cache line is indexed), which may be based, in part, on the history information, if any, of cache lines within the subject congruence class. The selected victim's history log is transferred to the system controller in conjunction with the cast-out of the victim cache line to system memory. The process then passes to step 510, which depicts requesting the new cache line via the system bus.

The process then passes to step 512, which illustrates a determination of whether the requested cache line has been returned on the system bus. If not, the process returns to step 512 to continue awaiting return of the requested cache line. If so, however, the process proceeds instead to step 514, which depicts sending the cache line to the requesting device and caching the cache line within the cache. The process then passes to step 516, which illustrates a determination of whether any $T_{-1}$ history was received for the requested cache line (from a snoop response, for example). If so, the process proceeds to step 518, which depicts updating the $T_{-1}$ history field for the requested cache line within the cache directory.

The process passes next to step 520, which illustrates a determination of whether any $T_{-2}$ history was received for the requested cache line. No $T_{-2}$ history will exist without some $T_{-1}$ history. If $T_{-2}$ history was received for the requested cache line, the process proceeds to step 522, which depicts updating the $T_{-2}$ history field for the requested cache line within the cache directory. The process then passes to step 524, which illustrates updating the coherency state for the cache line within the directory (which may be updated based at least in part on $T_{-1}$ history or $T_{-2}$ history information, if any). The above-described example of speculatively acquiring exclusive access of a line is an example of a coherency state update (in which the coherency state of the line goes from shared to exclusive) based solely on the historical access information. The process then passes to step 526, which depicts the process again becoming idle until another access request is received.

The present invention provides a system and method for recording and analyzing the processor accesses to and state transitions of a cache line, enabling projection of future accesses of the cache line according to previous state transitions. Using this projection, the present invention is able to more efficiently manage the contents of the cache memory.

While the invention has been particularly shown and described with reference to a preferred embodiment, it will be understood by those skilled in the art that various changes in form and detail may be made therein without departing from the spirit and scope of the invention.

What is claimed is:

1. A cache directory entry, comprising:
   an address tag identifying data stored within a corresponding cache memory entry;
   a coherency state identifier for the corresponding cache memory entry;
   a replacement order identifier for the corresponding cache memory entry; and
   a processor access history containing a plurality of subentries each containing information regarding one or more accesses of the corresponding cache memory entry by a different processor, wherein a first subentry contains a processor identifier and an operation code for at least one processor access of the corresponding cache memory entry by a processor which most recently accessed the corresponding cache memory entry, and wherein a second subentry contains a processor identifier and an operation code for at least one processor access of the corresponding cache memory entry by a different processor that previously accessed the corresponding cache memory entry.

2. The cache directory entry of claim 1, wherein the first subentry contains information regarding access of the corresponding cache memory entry by a processor supported by a cache containing the cache directory entry, and wherein the second subentry contains information regarding access of the corresponding cache memory entry by a processor not supported by the cache containing the cache directory entry.

3. The cache directory entry of claim 1, wherein the first subentry contains a timestamp for each access of the corresponding cache memory entry by the processor.

4. A cache comprising:
   a cache memory;
   a cache directory for the cache memory, said cache directory including a plurality of cache directory entries in accordance with claim 1; and
   a cache controller controlling access to said cache memory.

5. A data processing system, comprising:
   a system interconnect;
   at least a first processor and a second processor; and
   a cache supporting the first processor and coupled to the system interconnect, the cache including a cache memory and a corresponding cache directory, wherein each cache directory entry includes:
      an address tag identifying data stored within a corresponding cache memory entry,
      a coherency state identifier for the corresponding cache memory entry;
      a replacement order identifier for the corresponding cache memory entry; and
      a processor access history containing a plurality of subentries each containing information regarding one or more accesses of the corresponding cache memory entry by a different processor, wherein a first subentry contains a processor identifier and an operation code for at least one access of the corresponding cache memory entry by a processor which most recently accessed the corresponding cache memory entry, and wherein a second subentry contains a processor identifier and an operation code for at least one access of the corresponding cache memory entry by a different processor that previously accessed the corresponding cache memory entry.

6. The data processing system of claim 5, wherein the first subentry is a T0 subentry and the second subentry is a T−1.

7. The data processing system of claim 5, wherein said second subentry records processor access requests received by caches other than the cache, and wherein the cache receives the second subentry with the corresponding cache memory entry in response to a first access request for the corresponding cache memory entry by the processor.

8. A method of controlling a cache, comprising:
   within each directory entry within the cache, storing an address tag identifying data stored within a corresponding cache memory entry and a processor access history containing a plurality of subentries each containing information regarding one or more accesses of the corresponding cache memory entry by a different processor, wherein a first subentry contains a processor identifier and an operation code for at least one processor access of the corresponding cache memory entry by a processor which most recently accessed the corresponding cache memory entry, and wherein a second subentry contains a processor identifier and an operation code for at least one processor access of the corresponding cache memory entry by a different processor that previously accessed the corresponding cache memory entry; and
   employing the processor access history in management of the cache, wherein the step of employing the processor access history in management of the cache further includes setting a replacement order identifier for the corresponding cache memory entry based on the processor access history.

9. The method of claim 8, further comprising:
   storing a coherency state identifier and a replacement order identifier for the corresponding cache memory entry within each cache directory entry.

10. The method of claim 8, wherein the step of storing further comprises:

storing within the first subentry information regarding access of the corresponding cache memory entry by a processor supported by the cache and storing within the second subentry information regarding access of the corresponding cache memory entry by a processor not supported by the cache.

11. The method of claim 8, wherein the step of storing further comprises:

storing, within the first subentry a timestamp for each access of the corresponding cache memory entry by the processor.

12. The method of claim 8, wherein the step of employing the processor access history in management of the cache further comprises:

setting a coherency state for the corresponding cache memory entry based on the processor access history.

13. The method of claim 8, wherein the step of employing the processor access history in management of the cache further comprises:

modifying a cache management algorithm for the corresponding cache memory entry based on the processor access history.

14. The method of claim 8, further comprising:

responsive to snooping an operation targeting the corresponding cache memory entry, appending the processor access history to a snoop response.

15. The method of claim 8, further comprising:

upon allocation of storage for the corresponding cache memory entry, storing any processor access history received with the cache memory entry within a corresponding cache directory entry.

16. A method of controlling a cache, comprising:

within each directory entry within the cache, storing an address tag identifying data stored within a corresponding cache memory entry and a processor access history containing a plurality of subentries each containing information regarding one or more accesses of the corresponding cache memory entry by a different processor, wherein a first subentry contains a processor identifier and an operation code for at least one processor access of the corresponding cache memory entry by a processor which most recently accessed the corresponding cache memory entry, and wherein a second subentry contains a processor identifier and an operation code for at least one processor access of the corresponding cache memory entry by a different processor that previously accessed the corresponding cache memory entry;

employing the processor access history in management of the cache; and during eviction of the corresponding cache memory entry, transmitting the processor access history with the evicted cache memory entry.

\* \* \* \* \*